US009583071B2

(12) United States Patent
Nagashima

(10) Patent No.: US 9,583,071 B2
(45) Date of Patent: Feb. 28, 2017

(54) CALIBRATION APPARATUS AND CALIBRATION METHOD

(71) Applicant: CANON KABUSHIKI KAISHA, Tokyo (JP)

(72) Inventor: Yoshiyuki Nagashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 14/628,576

(22) Filed: Feb. 23, 2015

(65) Prior Publication Data

US 2015/0243249 A1 Aug. 27, 2015

(30) Foreign Application Priority Data

Feb. 25, 2014 (JP) ................................ 2014-034014

(51) Int. Cl.

| | |
|---|---|
| ***G09G 5/02*** | (2006.01) |
| ***G09G 3/00*** | (2006.01) |
| ***G09G 5/10*** | (2006.01) |
| ***H04N 5/57*** | (2006.01) |
| ***H04N 9/64*** | (2006.01) |
| ***H04N 5/45*** | (2011.01) |

(52) U.S. Cl.

CPC ............... *G09G 5/02* (2013.01); *G09G 3/006* (2013.01); *G09G 5/10* (2013.01); *G09G 2320/0626* (2013.01); *G09G 2320/0666* (2013.01); *G09G 2320/0673* (2013.01); *G09G 2320/0693* (2013.01); *G09G 2360/145* (2013.01)

(58) Field of Classification Search

CPC combination set(s) only.
See application file for complete search history.

(56) References Cited

U.S. PATENT DOCUMENTS 6,297,791 B1 * 10/2001 Naito ........................ G09G 3/34 345/102
2007/0146266 A1 * 6/2007 Yasuda .................. G09G 3/006 345/88
2009/0201310 A1 * 8/2009 Weiss .................... G06T 11/001 345/594
2009/0202235 A1 * 8/2009 Li ....................... H04N 5/23212 396/125

(Continued)

FOREIGN PATENT DOCUMENTS

JP 2002-209230 A 7/2002
JP 2007-208629 A 8/2007

*Primary Examiner* — Wesner Sajous

(74) *Attorney, Agent, or Firm* — Cowan, Liebowitz & Latman, P.C.

(57) ABSTRACT

A calibration apparatus comprises: a determination unit configured to determine, for each of a plurality of calibration images, which one of a plurality of subranges to which a characteristic value of the calibration image belongs; a display unit configured to simultaneously display, on a display apparatus, two or more calibration images of which the characteristic values are determined to belong to same subrange; an acquisition unit configured to acquire a calibration measurement value, which is a measurement value representing at least a display brightness or a display color of the calibration image; and a calibration unit configured to execute calibration of the display apparatus based on the calibration measurement value acquired by the acquisition unit.

17 Claims, 8 Drawing Sheets

(56) References Cited

U.S. PATENT DOCUMENTS

| | | | | |
|---|---|---|---|---|
| 2011/0199398 A1* | 8/2011 | Yui | G09G 3/22 | 345/690 |
| 2013/0239057 A1* | 9/2013 | Ubillos | G06F 3/04855 | 715/833 |
| 2014/0044372 A1* | 2/2014 | Mertens | H04N 19/46 | 382/248 |
| 2014/0205207 A1* | 7/2014 | Bhatt | G06T 5/00 | 382/311 |
| 2015/0047903 A1* | 2/2015 | Gramstad | G01V 1/345 | 175/50 |

* cited by examiner

CALIBRATION APPARATUS AND CALIBRATION METHOD

BACKGROUND OF THE INVENTION

Field of the Invention

The present invention relates to a calibration apparatus and a calibration method.

Description of the Related Art

The image quality of today's display apparatuses is becoming higher and higher, as well as the demands of the users for the stability and high-precision color reproduction of the display devices.

However, color reproduction by a display apparatus changes due to, for example, the time-related deterioration of the display elements thereof. Calibration of the display apparatus on a regular basis is therefore necessary in order to always realize stable color reproductivity.

Japanese Patent Application Laid-open No. 2002-209230 and Japanese Patent Application Laid-open No. 2007-208629, for example, disclose the conventional calibration techniques.

According to the technique disclosed in Japanese Patent Application Laid-open No. 2002-209230, a patch image is displayed on the screen of a display apparatus. Then, the quality of the displayed image (the image displayed on the screen) is adjusted based on the display brightness (the brightness on the screen) and display color (the color on the screen) of the patch image which a user measured using an optical sensor.

According to the technique disclosed in Japanese Patent Application Laid-open No. 2007-208629, a plurality of patch images are displayed on the screen of a display apparatus at the same time. Then, an image of the screen (the plurality of patch images) is captured by an imaging apparatus such as a digital camera, and the image quality of the displayed image is adjusted based on the result of capturing the plurality of patch images. According to the technique disclosed in Japanese Patent Application Laid-open No. 2007-208629, because the measurement values of the plurality of patch images can be acquired at once, calibration can be executed within a short period of time.

However, as a result of simultaneously displaying the plurality of patch images on the screen, the light emitted from the patch image A is reflected off the surrounding wall or the like of the display apparatus and irradiated onto the region of the patch image B. As a result, the display brightness or display color of the patch image B are changed by the light emitted from the patch image A and reflected off the surrounding wall or the like of the display apparatus, lowering the calibration accuracy. Specifically, the calibration accuracy drops because calibration is executed based on the measurement value of the patch image B that is impacted by the reflected light.

The impacts of the reflected light are now described with reference to FIG. 9.

FIG. 9 illustrates an example in which four patch images are displayed simultaneously on the screen of a display apparatus. Reference numeral 401 represents the display apparatus, reference numeral 402 the patch images, and reference numeral 403 an imaging apparatus.

As shown in FIG. 9, let it assume that the plurality of patch images 402 of high brightness to low brightness are displayed simultaneously on the screen of the display apparatus 401. In this case, as shown by the arrow in FIG. 9, the light from the high-brightness patch image is reflected off a surrounding wall of the display apparatus 401 (a wall of the room where the display apparatus 401 is placed), and this reflected light is irradiated onto the low-brightness patch image. As a result, the display brightness of the low-brightness patch image is enhanced by the reflected light, changing the measurement value of the low-brightness patch image.

Furthermore, when the plurality of patch images 402, including a patch image C of a first color and a patch image D of a second color that is different significantly from the first color, are displayed simultaneously on the screen, the light from the patch image C is reflected off a surrounding wall of the display apparatus 401, and this reflected light is irradiated onto the patch image D. As a result, the display color of the patch image D is made close to the first color due to the reflected light, changing the measurement value of the patch image D.

The patch image, under the effect of the reflected light, is captured by the imaging apparatus 403, and calibration is executed based on this image-capturing result under the effect of the reflected light, lowering the calibration accuracy.

SUMMARY OF THE INVENTION

The present invention provides a technique capable of executing high-precision calibration of a display apparatus within a short period of time.

The present invention in its first aspect provides a calibration apparatus for executing calibration of a display apparatus, comprising:

a determination unit configured to determine, for each of a plurality of calibration images, which one of a plurality of subranges to which a characteristic value of the calibration image belongs, the plurality of subranges constituting an available range for the characteristic value;

a display unit configured to simultaneously display, on the display apparatus, two or more calibration images of which the characteristic values are determined to belong to same subrange;

an acquisition unit configured to acquire a calibration measurement value, which is a measurement value representing at least a display brightness or a display color of the calibration image; and a calibration unit configured to execute calibration of the display apparatus based on the calibration measurement value acquired by the acquisition unit.

The present invention in its second aspect provides a calibration method for a display apparatus, comprising:

a determination step of determining, for each of a plurality of calibration images, which one of a plurality of subranges to which a characteristic value of the calibration image belongs, the plurality of subranges constituting an available range for the characteristic value;

a display step of simultaneously displaying, on the display apparatus, two or more calibration images of which the characteristic values are determined to belong to same subrange;

an acquisition step of acquiring a calibration measurement value, which is a measurement value representing at least a display brightness or a display color of the calibration image; and a calibration step of executing calibration of the display apparatus based on the calibration measurement value acquired in the acquisition step.

The present invention in its third aspect provides a non-transitory computer readable medium that stores a program, wherein the program causes a computer to execute the calibration method.

According to the present invention, high-precision calibration of a display apparatus can be executed within a short period of time.

Further features of the present invention will become apparent from the following de script ion of exemplary embodiments with reference to the attached drawings.

DESCRIPTION OF THE EMBODIMENTS

Embodiment 1

A calibration apparatus and a calibration method according to Embodiment 1 of the present invention are described hereinafter with reference to the drawings. The calibration apparatus according to the present embodiment is an apparatus for executing calibration of a display apparatus.

Figure 1:
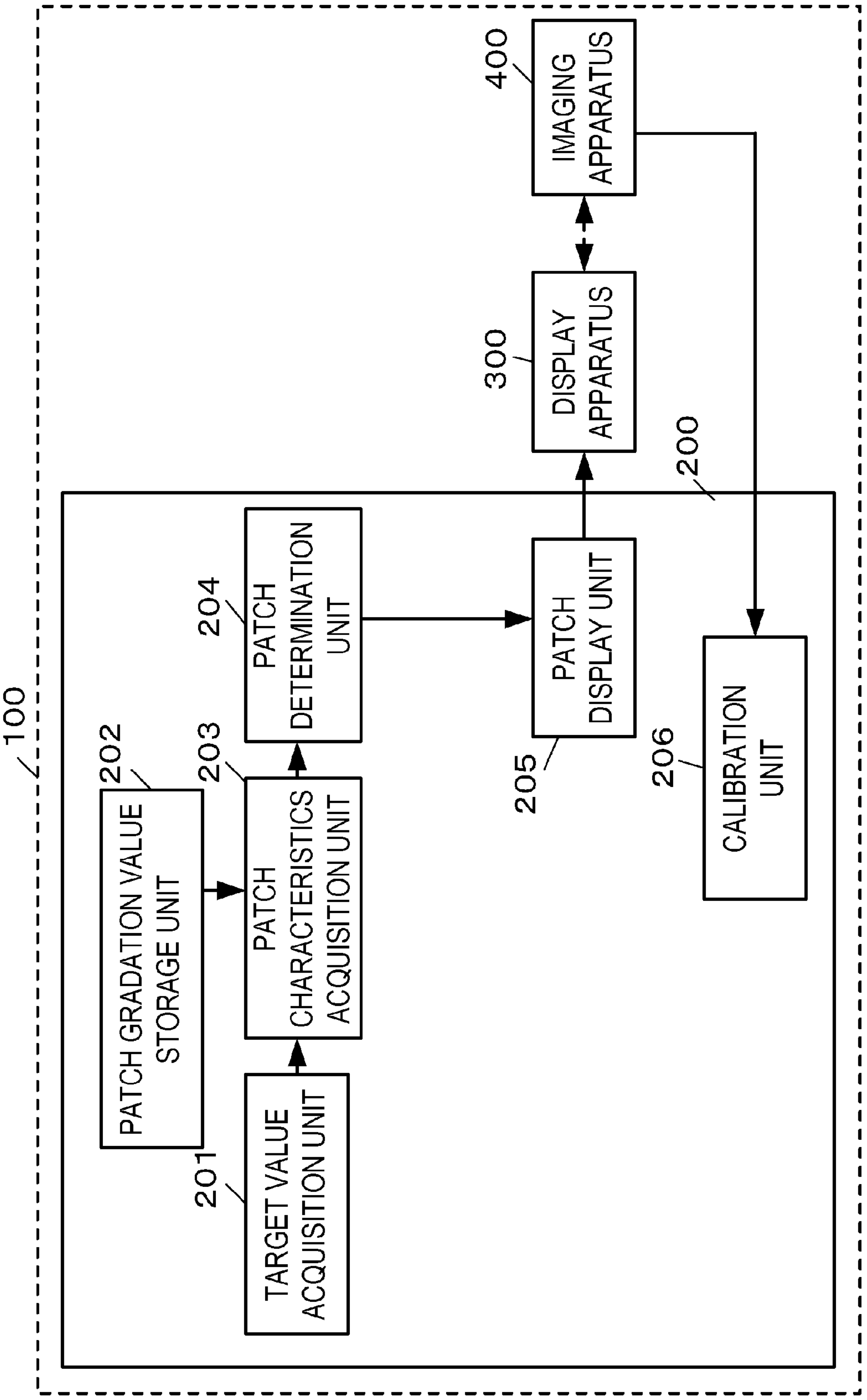
FIG. 1 is a block diagram showing an example of a calibration system according to Embodiment 1.

FIG. 1 is a block diagram showing an example of a calibration system 100 according to the present embodiment.

As shown in FIG. 1, the calibration system 100 has a calibration apparatus 200, a display apparatus 300, an imaging apparatus 400, and the like.

The display apparatus 300 is an apparatus for displaying an input image (image data). A liquid crystal display apparatus, a plasma display apparatus, an organic EL display apparatus, and the like can be employed as the display apparatus 300.

The imaging apparatus 400 is an apparatus for capturing an image and outputting the result thereof. In the present embodiment, the imaging apparatus 400 is positioned so as to be able to capture an image of the entire screen of the display apparatus 300. An apparatus capable of detecting light (the brightness and color of light) can be employed as the imaging apparatus 400. An optical sensor, a digital camera, and the like, for example, can be employed as the imaging apparatus 400.

The calibration apparatus 200 has a target value acquisition unit 201, a patch gradation value storage unit 202, a patch characteristics acquisition unit 203, a patch determination unit 204, a patch display unit 205, a calibration unit 206, and the like.

Note that the present embodiment describes an example in which the calibration apparatus 200 is an apparatus which is different from the display apparatus 300 and the imaging apparatus 400; however, the calibration apparatus 200 may have a display unit functioning as the display apparatus 300 and an imaging unit functioning as the imaging apparatus 400.

The target value acquisition unit 201 acquires a calibration target value. For example, the target value is a target value of display characteristics of the display apparatus 300. In the present embodiment, a target value of the display brightness (the brightness on the screen) corresponding to the maximum gradation value and a target value of a gamma value are acquired. The maximum gradation value is a gradation value of white.

Note that the target value is not limited to the target values described above (the target value of the display brightness corresponding to the maximum gradation value and the target value of a gamma value). For example, for each of a plurality of gradation values, a target value of the display brightness corresponding to the gradation value may be acquired. Furthermore, when images used for calibration (calibration images) are determined beforehand, for each of the calibration images, a target value of the display brightness corresponding to the calibration image may be acquired.

Note that a method for acquiring the target values is not particularly limited. For example, the user may input a target value, or a target value may be acquired from an external apparatus. The calibration apparatus 200 may determine the target values in accordance with the environment for installing the display apparatus 300, the purpose of use of the display apparatus 300, and the like. The target values may also be determined beforehand.

The patch gradation value storage unit 202 has the gradation values (pixel values) of calibration images stored therein beforehand. In the present embodiment, the patch images with uniform gradation values are used as the calibration images. A plurality of gradation values corresponding to a plurality of patch images are recorded beforehand in the patch gradation value storage unit 202. A semiconductor memory, a magnetic disk, an optical disk or the like can be employed as the patch gradation value storage unit 202.

Note that the gradation values of the patch images are not necessarily determined beforehand. For instance, the user may input the gradation values of the patch images, or the gradation values of the patch images may be acquired from an external apparatus. The calibration apparatus 200 may determine the gradation values of the patch images in accordance with the environment for installing the display apparatus 300, the purpose of use of the display apparatus 300, and the like.

Note that the calibration images are not limited to patch images. For example, the calibration images may be icons, illustrations, and the like. When a calibration image has a plurality of gradation values, the calibration image itself may be recorded beforehand in place of the gradation values of this calibration image.

The patch characteristics acquisition unit 203 acquires a characteristic value of each of the plurality of patch images. In the present embodiment, the patch characteristics acquisition unit 203 acquires the display brightness of the patch image as the characteristic value, based on the display characteristics of the display apparatus 300 and the gradation value of the patch image. In other words, the patch characteristics acquisition unit 203 estimates the display brightness of the patch image based on the display characteristics of the display apparatus 300 and the gradation value of the patch image. More specifically, the patch characteristics acquisition unit 203 estimates the display brightness of the patch image based on a target value of the display characteristics of the display apparatus 300 and the gradation value of the patch image.

Note that the characteristic value is not limited to the display brightness. For instance, the characteristic value may be a display color (a color on the screen), a combination of the display brightness and the display color, the gradation value of the calibration image, a representative value of the gradation value of the calibration image, and the like. The display color can be estimated from the target value of the display characteristics and the gradation value of the patch image. Examples of the representative value include the maximum value, minimum value, average value, mode, intermediate value, and the like.

Note that at least either the display brightness or the display color may be estimated us ing the current display characteristics in place of the target value of the display characteristics.

The patch determination unit 204 determines, for each of the plurality of patch images, which one of a plurality of subranges to which the characteristic value (an estimated value of the display brightness, in the present embodiment) of the patch image belongs, the plurality of subranges constituting an allowable range for the characteristic value. The present embodiment assumes that the plurality of subranges are defined beforehand.

However, the plurality of subranges may not be defined beforehand. For instance, the plurality of subranges may be determined by the user or an external apparatus, or the calibration apparatus 200 may determine the plurality of subranges in accordance with the environment for installing the display apparatus 300, the purpose of use of the display apparatus 300, and the like.

The patch display unit 205 displays, simultaneously on the display apparatus 300, a plurality of (two or more) calibration images of which the characteristic values are determined to belong to same subrange. In the present embodiment, the plurality of calibration images, of which the characteristic values are determined to belong to the subrange, are displayed simultaneously for each of the subranges. In other words, in the present embodiment, a plurality of calibration images of which the characteristic values are determined to belong to different subranges, are not displayed simultaneously on the display apparatus 300.

The calibration unit 206 acquires a calibration measurement value which is a measurement value representing at least the display brightness or display color of the patch image, from the imaging apparatus 400.

The calibration unit 206 then executes calibration of the display apparatus 300 based on the acquired calibration measurement values. In this calibration, for example, a parameter value used for changing the display characteristics of the display apparatus is determined (calculated), and then the determined parameter value is reflected in the display apparatus 300.

Note that the process for acquiring the measurement values may be executed by a function unit that is not the calibration unit 206. For instance, the calibration apparatus 200 may have an acquisition unit for acquiring the measurement values from the imaging apparatus 400.

Operations of the calibration apparatus 200 are described specifically hereinafter with reference to FIG. 2.

Figure 2:
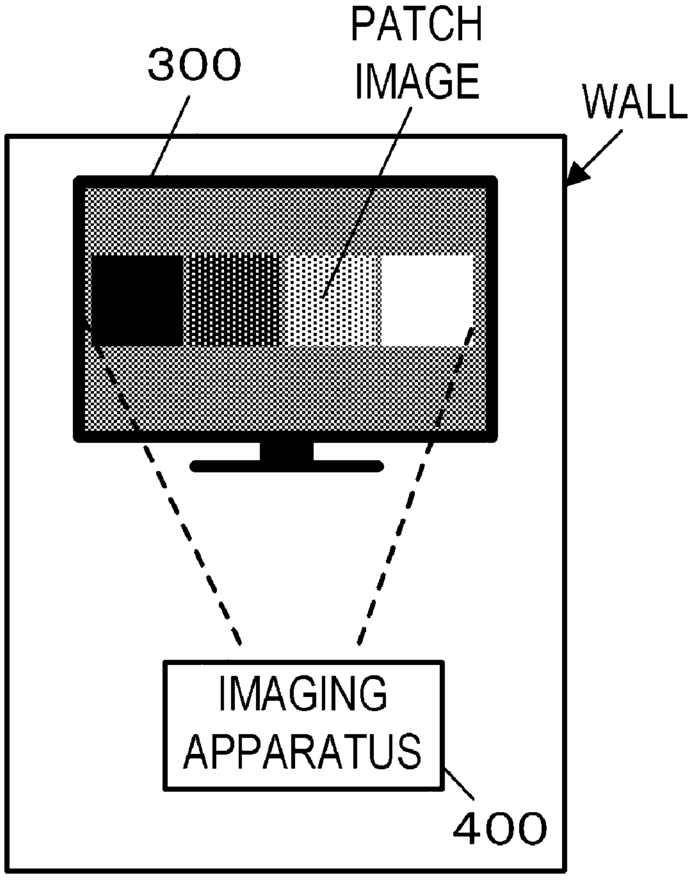
FIG. 2 is a diagram showing an example of the arrangement of a display apparatus and an imaging apparatus according to Embodiment 1.

FIG. 2 is a diagram showing an example of the arrangement of the display apparatus 300 and imaging apparatus 400.

In the present embodiment, the imaging apparatus 400 captures an image of the entire screen of the display apparatus 300, as shown in FIG. 2. Subsequently, calibration is executed based on the result of capturing an image, by the imaging apparatus 400, of the screen of the display apparatus 300 while the plurality of patch images are displayed thereon.

In the example shown in FIG. 2, the display apparatus 300 is placed in a room, the walls of which surround the display apparatus 300 exist.

First, calibration target values are input to the target value acquisition unit 201 by a user operation. The pre sent example assumes that the following target values are input. The following "target brightness value" is a target value of the display brightness corresponding to the maximum gradation value.

Target brightness value: 200 [cd/m$^2$]

Target gamma value: 2.2

Next, the patch characteristics acquisition unit 203 estimates, for each patch image, the display brightness of the patch image based on the target values acquired by the target value acquisition unit 201 and patch gradation value (the gradation value of the patch image) recorded in the patch gradation value storage unit 202.

In the present embodiment, the gradation value (pixel value) is 8-bit RGB value, and nine patch gradation values shown in Table 1 below (nine gradation values corresponding to nine patch images) are recorded beforehand in the patch gradation value storage unit 202.

TABLE 1

| Patch gradation value | | |
|---|---|---|
| R value | G value | B value |
| 0 | 0 | 0 |
| 32 | 32 | 32 |
| 64 | 64 | 64 |
| 96 | 96 | 96 |
| 128 | 128 | 128 |
| 160 | 160 | 160 |
| 192 | 192 | 192 |
| 224 | 224 | 224 |
| 225 | 225 | 225 |

Note that Table 1 shows an example in which the color of the patch images is black, gray, or white; however, the color of the patch images is not limited thereto. For instance, the color of the patch images may be red, green, blue, yellow, purple or the like.

Note that the pixel value is not limited to the RGB value. For example, the pixel value may be YCbCr value. In addition, the bit number of the pixel value may be greater than or lower than 8 bits.

In the present embodiment, the patch characteristics acquisition unit 203 calculates estimated brightness values of the patch image (estimated value of the display brightness) using the following Formula 1

$$\text{Estimated brightness value} = \text{Target brightness value} \times (\text{Patch gradation value}/255)^{2.2} \quad \text{(Formula 1)}$$

The calculation results of the estimated brightness values of the patch images that are obtained by Formula 1 are shown in the following Table 2. Note that the present embodiment assumes that the black display brightness of the display apparatus 300 is 0.1 [cd/$m^2$].

TABLE 2

| Patch gradation value | | | Estimated brightness value |
|---|---|---|---|
| R value | G value | B value | [cd/$m^2$] |
| 0 | 0 | 0 | 0.1 |
| 32 | 32 | 32 | 2.1 |
| 64 | 64 | 64 | 9.6 |
| 96 | 96 | 96 | 23.3 |
| 128 | 128 | 128 | 43.9 |
| 160 | 160 | 160 | 71.7 |
| 192 | 192 | 192 | 107.1 |
| 224 | 224 | 224 | 150.4 |
| 225 | 225 | 225 | 200.0 |

Note that the method for estimating the display brightnesses and display colors is not limited to the foregoing method. For example, the intensity ratio between the R value, G value and B value of the patch image may be calculated, and the display brightness and display color of the patch image may be estimated based on the calculation result of the intensity ratio.

Next, the patch determination unit 204 determines, for each of the patch images, which one of the plurality of subranges (brightness categories) to which the estimated brightness value estimated by the patch characteristics acquisition unit 203 belongs. The patch determination unit 204 then outputs, to the patch display unit 205, category information indicating the brightness category to which the estimated brightness value of each patch image belongs.

In the present embodiment, a total of three brightness categories are set beforehand: a brightness category 1 with estimated brightness values of less than 10 [cd/$m^2$], a brightness category 2 with estimated brightness values of 10 to 80 [cd/$m^2$], and a brightness category 3 with estimated brightness values of 80 [cd/$m^2$] or higher. Table 3 below shows the determination results for the brightness categories to which the estimated brightness values belong.

TABLE 3

| Patch gradation value | | | Estimated brightness | Brightness |
|---|---|---|---|---|
| R value | G value | B value | value | category |
| 0 | 0 | 0 | 0.1 | Brightness |
| 32 | 32 | 32 | 2.1 | category 1 |
| 64 | 64 | 64 | 9.6 | |
| 96 | 96 | 96 | 23.3 | Brightness |
| 128 | 128 | 128 | 43.9 | category 2 |
| 160 | 160 | 160 | 71.7 | |
| 192 | 192 | 192 | 107.1 | Brightness |
| 224 | 224 | 224 | 150.4 | category 3 |
| 225 | 225 | 225 | 200.0 | |

Note that the subranges are not limited to the subranges described above. Also, the number of subranges may be greater than or less than 3.

Figure 3:
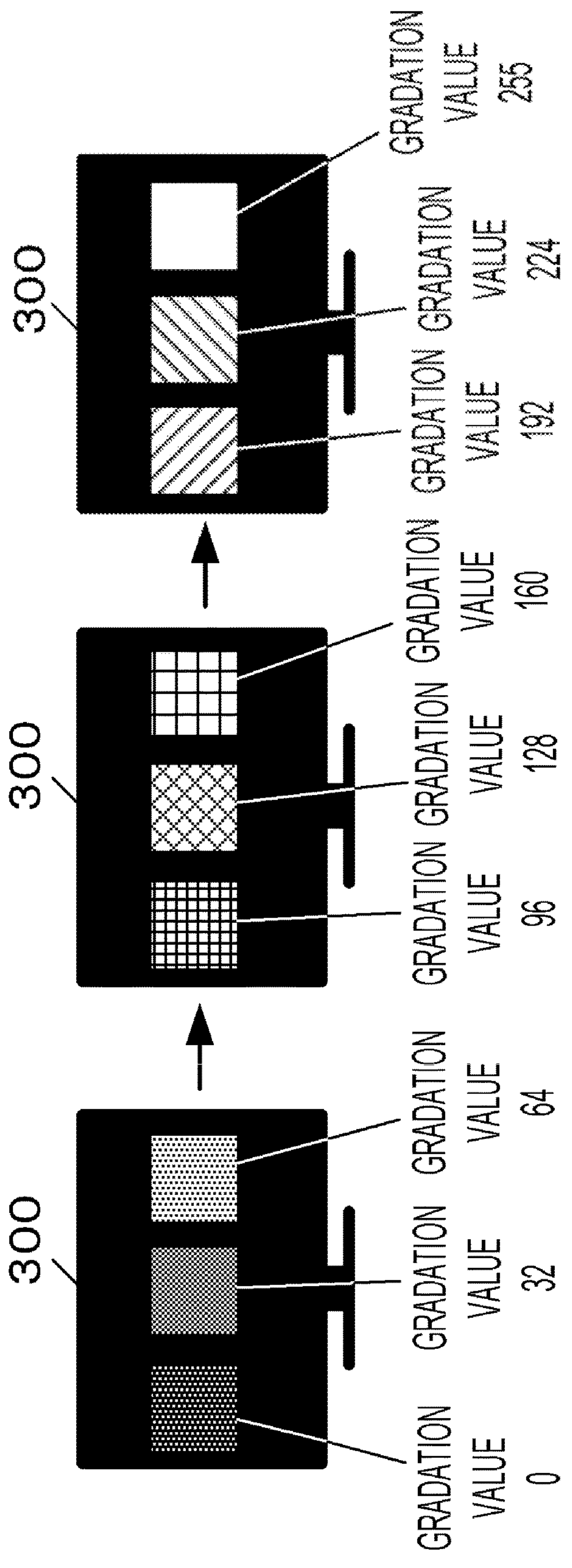
FIG. 3 is a diagram showing an example of a method for displaying patch images according to Embodiment 1.

Based on the category information from the patch determination unit 204, the patch display unit 205 generates image data showing the locations of the plurality of patch images are located, and outputs the generated image data to the display apparatus 300. Specifically, the patch display unit 205 performs, for each brightness category, a process for generating image data showing the locations of all the patch images, of which the estimated brightness values are determined to belong to the brightness category, and then outputting the generated image data to the display apparatus 300. As a result, all the patch images, of which the estimated brightness values are determined to belong to the brightness category, are displayed simultaneously on the screen of the display apparatus 300, for each brightness category. Specifically, as shown in FIG. 3, the nine patch images that are prepared beforehand are displayed on the screen in three parts.

In the present embodiment, the imaging apparatus 400 executes image capturing during the process executed by the patch display unit 205. Specifically, the imaging apparatus 400 executes image capturing for each brightness category and outputs the imaging result (captured image) for each brightness category to the calibration unit 206.

Next, the calibration unit 206 acquires the patch measurement values (the measurement values of the patch images) from the captured images output by the imaging apparatus 400, and executes calibration based on the acquired patch measurement values. Specifically, the measurement values of all the patch images on the captured image are acquired for each brightness category. Then, calibration is executed using all the acquired patch measurement values.

When a plurality of patch images with a large difference in brightness therebetween (e.g., the high-brightness patch image with a gradation value of 255 and a low-brightness patch image with a gradation value of 0) are displayed simultaneously on the screen, the light from the high-brightness patch image is reflected off a surrounding wall of the display apparatus 300, and this reflected light is irradiated onto the low-brightness patch image. As a result, the display brightness of the low-brightness patch image is enhanced by the reflected light, resulting in an error in the measurement value of the low-brightness patch image. Even when a plurality of patch images with a large difference in color therebetween are displayed on the screen, an error occurs similarly, resulting in low calibration accuracy.

According to the present embodiment, it is determined, for each of the plurality of calibration images, which one of the plurality of subranges to which the characteristic value of the calibration image belong is determined, the plurality of subranges constituting an allowable range for the characteristic value. Consequently, a plurality of calibration images of which the characteristic values are determined to belong, are not displayed simultaneously on the display apparatus, but a plurality of calibration images which the characteristic values are determined to belong, are displayed simultaneously on the display apparatus. As a result, a plurality of calibration images with a large difference in the characteristic value therebetween can be prevented from being displayed simultaneously on the display apparatus. Accordingly, the errors mentioned above can be reduced, and highly precise calibration can be realized. Moreover, because the calibration images are displayed simultaneously on the display apparatus, the number of times the calibration images are displayed can be reduced, allowing calibration to be executed within a short period of time.

Although the present embodiment has described an example in which calibration is executed using the measurement values of all the prepared calibration images; however, the present invention is not limited thereto. For instance, calibration may be performed without using some of the measurement values of the plurality of prepared calibration images. Those calibration images, the measurement values of which are not used in calibration, may be displayed on the display apparatus. For example, one subrange may be used as a specific subrange, and the calibration images, of which the characteristic values belong to the subranges from the specific subrange, may not be displayed on the display apparatus. Then, a plurality of calibration images, of which the characteristic values belong to the specific subrange, may be displayed simultaneously on the display apparatus, and calibration may be executed based on the measurement values of the plurality of calibration images of which the characteristic values belong to the specific subrange.

Note that the following processes may not be executed by the calibration apparatus.

Calibration can be executed within a short period of time by reducing the number of subranges. However, there is a possibility that reducing the number of subranges results in significant errors in measured values due to the reflected light. For instance, depending on the usage environment, measured values with significant errors might be obtained. Although errors in measured values can reliably be reduced by increasing the number of subranges, it leads to an increase in the calibration processing time.

The process described below can not only reduce errors in the measured values more reliably but also enables fast calibration.

First of all, using a plurality of first subranges as the plurality of subranges, a determination process for determining a subrange to which the characteristic value of the patch image belongs, a display process for displaying the patch image on the display apparatus, and an acquisition process for acquiring the patch measurement value, are executed.

In the display process using the plurality of first subranges, a plurality of first calibration images, of which the characteristic values are determined to belong to same first subrange, and an image with first gradation value are simultaneously displayed on the display apparatus.

In the acquisition process using the plurality of first subranges, a measurement value of the image having the first gradation value is acquired. The first gradation value is not particularly limited. The first gradation value is, for example, 0 (the gradation value corresponding to black). Note that the measurement value corresponding to the first gradation value may be acquired by a function unit different from the function unit for acquiring patch measurement values. For instance, the calibration apparatus 200 may have a first acquisition unit for acquiring the measurement value corresponding to the first gradation value.

Next, a level of fluctuation of the measurement values of the first gradation value between the plurality of first subranges is calculated. Note that the process for calculating the level of fluctuation may be executed by any function unit. The calibration apparatus may have a calculation unit for calculating the level of fluctuation.

Then, it is determined whether the calculated level of fluctuation is equal to or greater than a threshold. Note that the calibration apparatus may include a determination unit that determines whether the level of fluctuation is equal to or greater than a threshold. In addition, the threshold to be compared with the level of fluctuation may be a fixed value that is determined beforehand by the manufacturer or a value that can be changed by the user.

In a case where the calculated level of fluctuation is less than the threshold, calibration is executed using the patch measurement value acquired by the acquisition process in which the plurality of first subranges are used.

When the calculated level of fluctuation is equal to or greater than the threshold, using, as the plurality of subranges, a plurality of second subranges larger in number than the plurality of first subranges, the plurality of second subranges constituting the available range for the characteristic value, the determination process, display process, and acquisition process are executed again. Subsequently, calibration is executed using a patch measurement value acquired by the acquisition process in which the plurality of second subranges are used.

In a case where the level of fluctuation of the measurement values of the first gradation value is large, it is likely that a measurement value with a large error due to the reflected light is obtained. In this case, the foregoing processes can reliably reduce the errors generated by the reflected light, by using the second subranges that are obtained by finely dividing the available range for the characteristic value. Also, in a case where the level of fluctuation of the measurement values of the first gradation value is low, the first subranges are used. Therefore, compared to when the second subranges are constantly used, the time required for the calibration process can be reduced.

In the display process using the plurality of first subranges, it is preferred that the image with the first gradation value be displayed on the display apparatus so that the positions thereof are the same among the plurality of first subranges. In this manner, a value that precisely represent s the error caused by the reflected light can be obtained as the level of fluctuation.

Note that the calibration images to be used may be different between when the plurality of first subranges are used and when the plurality of second subranges are used. For example, when the plurality of first subranges are used, the plurality of first calibration images are used, and when the plurality of second subranges are used, a plurality of second calibration images that are larger in number than the plurality of first calibration images may be used. When the plurality of second subranges are used, the number of calibration images to be used increases. For this reason, more calibration images can be displayed simultaneously, compared to when the plurality of first calibration images are used. Such a configuration can further improve the calibration accuracy in using the plurality of second subranges. The plurality of second calibration images may or may not include the plurality of first calibration images.

Embodiment 2

A calibration apparatus and a calibration method according to Embodiment 2 of the present invention are described hereinafter with reference to the drawings.

Embodiment 1 has illustrated an example in which the process of displaying a plurality of prepared calibration images on the screen in multiple parts is always executed.

However, because the impact of the reflected light is low depending on the usage environment, in some cases a calibration measurement value with a large error cannot be obtained even when all the prepared calibration images are displayed simultaneously.

The present embodiment describes an example in which all the prepared calibration images are displayed simultaneously when the impact of the reflected light is low.

Such a configuration can reduce the number of times the calibration images are displayed, hence the time required for the calibration process.

Figure 4:
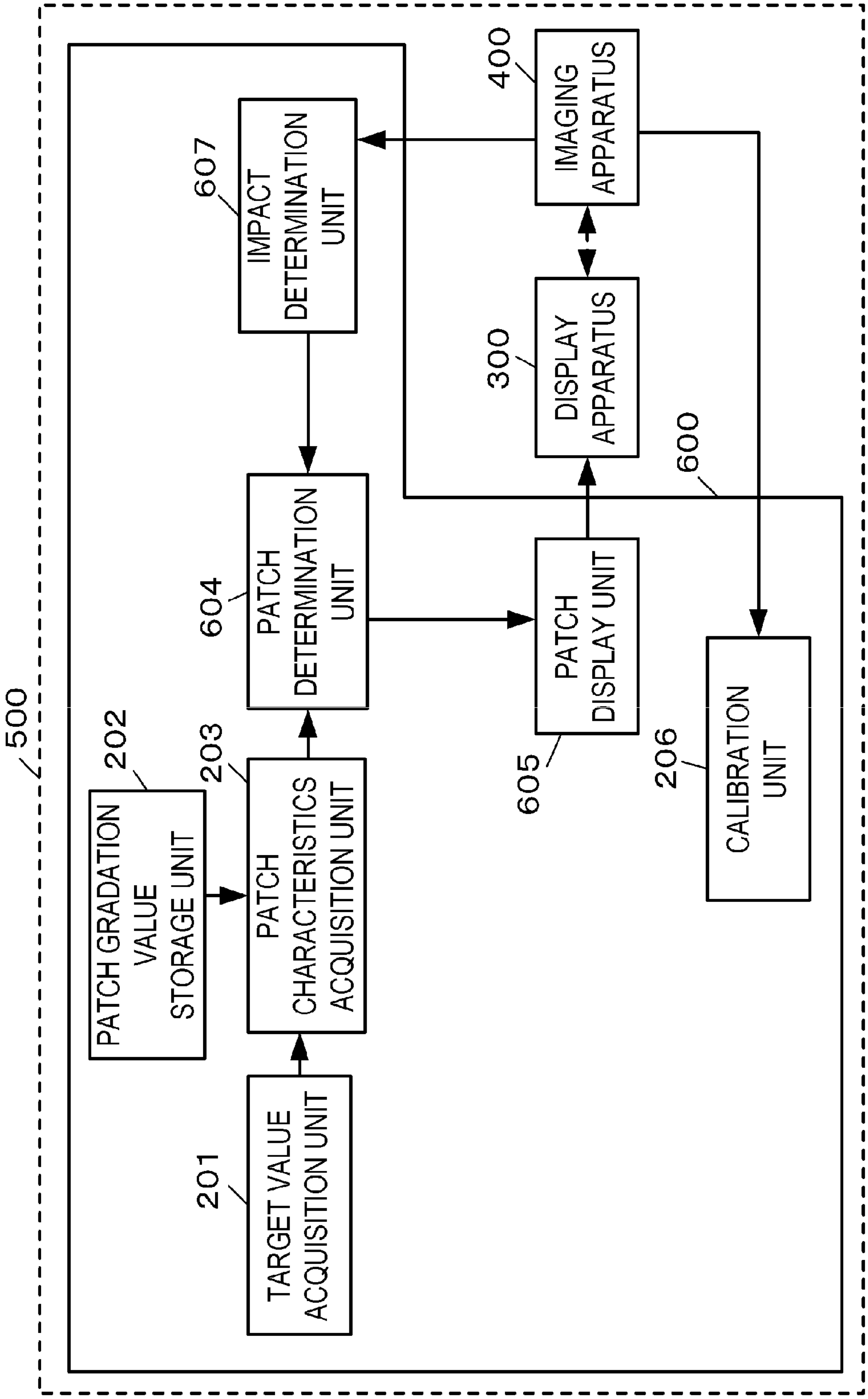
FIG. 4 is a block diagram showing an example of a calibration system according to Embodiment 2.

FIG. 4 is a block diagram showing an example of a calibration system 500 according to the present embodiment. The function units and apparatuses shown in FIG. 4 that are the same as those described in Embodiment 1 (FIG.

1) are denoted the same reference numerals; thus, the descriptions thereof are omitted accordingly.

As shown in FIG. 4, the calibration system 500 has a calibration apparatus 600, the display apparatus 300, the imaging apparatus 400, and the like.

The calibration apparatus 600 has the target value acquisition unit 201, patch gradation value storage unit 202, patch characteristics acquisition unit 203, a patch determination unit 604, a patch display unit 605, the calibration unit 206, an impact determination unit 607, and the like.

The patch display unit 605 performs a first process for displaying an image having a second gradation value on the display apparatus 300, and a second process for simultaneously displaying an image having a second gradation value and an image having a third gradation value on the display apparatus, sequentially before starting to display calibration images. This method for displaying calibration images is the same as that of the patch display unit 205 described in Embodiment 1.

The impact determination unit 607 acquires measurement values of the images with the second gradation value, and determines the presence/absence of the impact of the reflected light based on the acquired measurement values. Specifically, the impact determination unit 607 determines whether or not the difference between the measurement value of the second gradation value displayed in the second process and the measurement value of the second gradation value displayed in the first process is equal to or less than a threshold. In a case where the difference is greater than the threshold, the impact determination unit 607 determines that there is an impact of the reflected light. In a case where the difference is equal to or less than the threshold, the impact determination unit 607 determines that there is no impact of the reflected light. The impact determination unit 607 outputs the result of determination on the presence/absence of an impact of the reflected light to the patch determination unit 604.

Note that the measurement values of the second gradation value may be acquired by a function unit different from the impact determination unit 607. For example, the calibration apparatus 600 may have a second acquisition unit for acquiring the measurement values of the second gradation value.

Note that the threshold to be compared with the difference may be a fixed value that is determined beforehand by the manufacturer or a value that can be changed by the user.

The patch determination unit 604 generates the category information based on the result of determination on the presence/absence of an impact of the reflected light, and outputs the generated category information to the patch display unit 605. Specifically, in a case where it is determined that there is an impact of the reflected light, the category information is generated in the same manner as in Embodiment 1. In a case where it is determined that there is no impact of the reflected light, the category information for simultaneously displaying all prepared graphic images (category information in which all the prepared graphic images are associated with one brightness category) is generated.

Therefore, when it is determined that there is an impact of the reflected light, the patch display unit 605 performs the process for displaying the plurality of prepared calibration images on the display apparatus 300 in multiple parts, as in Embodiment 1. When it is determined that there is no impact of the reflected light, the patch display unit 605 performs the process for simultaneously displaying all the prepared calibration images on the display apparatus 300.

Operations of the calibration apparatus 600 are specifically described hereinafter.

Note that the same operations as those described Embodiment 1 are not described here.

Also, note that the present embodiment assumes that the same nine patch images as those described in Embodiment 1 are used in calibration.

First, the patch display unit 605 performs a first process for displaying an image with a second gradation value on the display apparatus 300, and a second process for simultaneously displaying the image with the second gradation value and an image with a third gradation value on the display apparatus, sequentially before starting to display calibration images.

It may be noted that the impact determination unit 607 may generate the image displayed in the first process and the images displayed in the second process, and output these generated images to the patch display unit 605. The patch display unit 605, thereafter, may display the images output from the impact determination unit 607 on the display apparatus 300.

In the present embodiment, a gradation value of 0 corresponding to black is used as the second gradation value, and a gradation value of 255 corresponding to white as the third gradation value. Specifically, the image shown in FIG. 5A is displayed in the first process, and the image shown in FIG. 5B is displayed in the second process.

Note that the second gradation value and the third gradation value are not limited to the values described above. The second gradation value and the third gradation value may take any values. However, it is preferred that the third gradation value make a significant change in the display brightness of the image having the second gradation value, when there is an impact of the reflected light. It is, therefore, preferred that the third gradation value be greater than the second gradation value. In other words, the image having the third gradation value is preferably brighter than the image having the second gradation value. By using an image brighter than the image with the second gradation value as the image with the third gradation value, the presence/absence of an impact of the reflected light can be determined with high accuracy. In addition, the greater the value obtained by subtracting the brightness of the image having the second gradation value from the brightness of the image having the third gradation value, the more precisely the presence/absence of an impact of the reflected light can be determined. Therefore, the presence/absence of an impact of the reflected light can be determined with extremely high accuracy by using the gradation value corresponding to black as the second gradation value and the gradation value corresponding to white as the third gradation value.

Figure 5A:
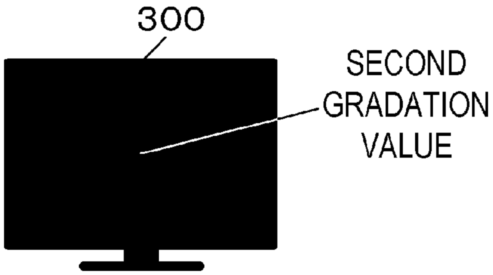
FIG. 5A is a diagram showing an example of an image displayed by a first process according to Embodiment 2.
Figure 5B:
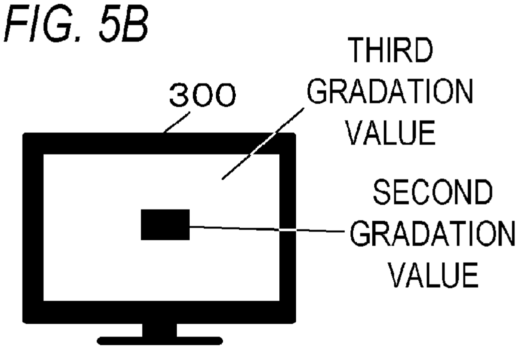
FIG. 5B is a diagram showing an example of an image displayed by a second process according to Embodiment 2.

Also, the images displayed in the first and second processes are not limited to the images shown in FIGS. 5A and 5B. For example, in FIG. 5B, the image with a second pixel value is placed so as to surround the image with a third pixel value, but the image with the third pixel value and the image with the second pixel value may be arranged horizontally.

In the present embodiment, the imaging apparatus 400 executes image capturing during the first and second processes. The imaging apparatus 400 outputs an image captured during the first process (a first captured image) and an image captured during the second process (a second captured image) to the impact determination unit 607.

Next, the impact determination unit 607 acquires a first measurement value from the first captured image output by the imaging apparatus 400, and a second measurement value from the second captured image output by the imaging apparatus 400. The first measurement value is the measurement value of the second gradation value displayed in the first process, and the second measurement value is the measurement value of the second gradation value displayed in the second process.

The impact determination unit 607 determines the presence/absence of an impact of the reflected light based on the acquired first and second measurement values, and outputs the determination result to the patch determination unit 604. Specifically, the impact determination unit 607 determines whether the acquired first and second measurement values satisfy the following Formula 2. In Formula 2, "Lu_1" represents the first measurement value, "Lu_2" the second measurement value, and "L_Th" a threshold. In a case where the first measurement value and the second measurement value satisfy Formula 2, it is determined that there is a no impact of the reflected light. In a case where the first measurement value and the second measurement value do not satisfy Formula 2, it is determined that there is an impact of the reflected light. In other words, when the first value Lu_1 is substantially equal to the second measurement value Lu_2, it is determined that there is no impact of the reflected light. The impact determination unit 607 then outputs a flag F1 to the patch determination unit 604 when it is determined that there is no impact of the reflected light, and outputs a flag F2 to the patch determination unit 604 when it is determined that there is an impact of the reflected light.

$$(Lu\_1-Lu\_2)/Lu\_2|\times 100\leq Th \quad \text{(Formula 2)}$$

Next, the patch determination unit 604 generates the category information based on the flag output from the impact determination unit 607, and outputs the generated category information to the patch display unit 605.

Specifically, upon reception of the flag F1, the patch determination unit 604 generates the category information for simultaneously displaying all the nine patch images.

Furthermore, upon reception of the flag F2, the patch determination unit 604 generates the category information for displaying the nine patch images in three parts, as in Embodiment 1.

Note that the process for acquiring the target values and the process for acquiring the characteristic values are executed as in Embodiment 1, prior to the process for generating the category information.

Figure 6:
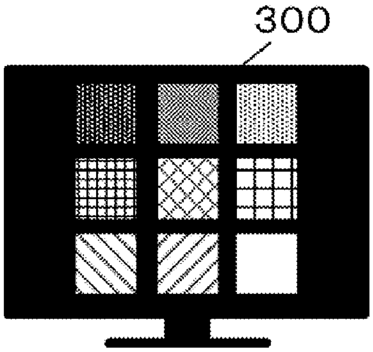
FIG. 6 is a diagram showing an example of a method for displaying patch images according to Embodiment 2.

Subsequently, the patch display unit 605 generates image data showing the locations of the plurality of patch images based on the category information generated by the patch determination unit 604, and outputs the generated image data to the display apparatus 300. As a result, in a case where the flag F1 is output from the impact determination unit 607, all the nine patch images are displayed simultaneously on the screen, as shown in FIG. 6. In a case where the flag F2 is output from the impact determination unit 607, the nine patch images are displayed in three parts, as in Embodiment 1 (FIG. 3).

After the patch images are displayed, the process for capturing an image of the screen, the process for acquiring the patch measurement values, and the calibration process are executed, as in Embodiment 1.

According to the present embodiment, as described above, the presence/absence of an impact of the reflected light is determined, and when it is determined that there is no impact of the reflected light, all the prepared calibration images are displayed simultaneously. This leads to a further reduction in the number of times the calibration images are displayed, hence the time required for the calibration process.

Embodiment 3

A calibration apparatus and a calibration method according to Embodiment 3 are described hereinafter with reference to the drawings.

The present embodiment describes an example of a calibration process higher in precision than the calibration processes described in Embodiments 1 and 2.

Figure 7:
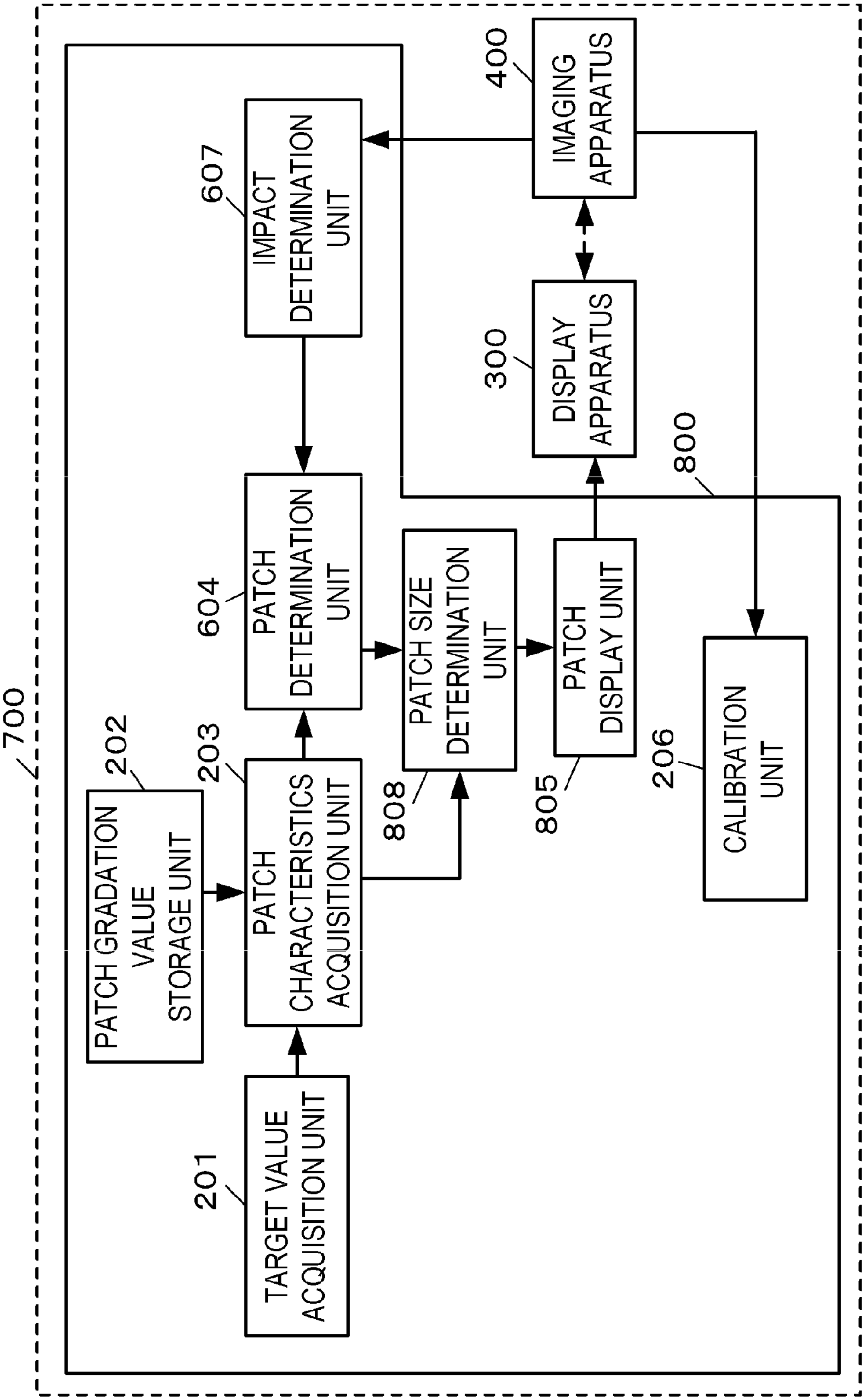
FIG. 7 is a block diagram showing an example of a calibration system according to Embodiment 3.

FIG. 7 is a block diagram showing an example of a calibration system 700 according to the present embodiment. The function units and apparatuses shown in FIG. 7 that are the same as those described in Embodiments 1 and 2 (FIGS. 1 and 4) are denoted the same reference numerals; thus, the descriptions thereof are omitted accordingly.

As shown in FIG. 7, the calibration system 700 has a calibration apparatus 800, the display apparatus 300, the imaging apparatus 400, and the like.

The calibration apparatus 800 has the target value acquisition unit 201, patch gradation value storage unit 202, patch characteristics acquisition unit 203, patch determination unit 604, a patch display unit 805, the calibration unit 206, an impact determination unit 607, a patch size determination unit 808, and the like.

Although FIG. 7 shows an example in which the patch size determination unit 808 is added to the calibration apparatus of Embodiment 2 (FIG. 4), the patch size determination unit 808 may be added to the calibration apparatus of Embodiment 1 (FIG. 1).

The patch size determination unit 808 acquires the category information from the patch determination unit 604 and acquires the estimated brightness values of the patch images from the patch characteristics acquisition unit 203. The patch size determination unit 808 then determines the size of each of the patch images based on the acquired category information and estimated brightness values, and outputs size information indicating the determined sizes to the patch display unit 805. Specifically, the patch size determination unit 808 determines the size of each patch image (display size) in such a manner that the plurality of patch images displayed simultaneously share the same value that is obtained by multiplying the brightness of each patch image by the size of each patch image. Hereinafter, the value obtained by multiplying the brightness of each patch image by the size of each patch image is referred to as "surface brightness".

The patch size determination unit 808 also outputs the acquired category information to the patch display unit 805.

Note that, when determining the sizes of the patch images, the gradation values of the patch images or representative values thereof may be used in place of the estimated brightness values. For instance, a Y value (Y value of YCbCr value) calculated from the RGB value of each patch image or a representative value thereof may be used.

In the present embodiment, using the following Formula 3, the patch size determination unit 808 calculates, for each subrange, the size of each patch image, of which the characteristic value is determined to belong to the subrange. In Formula 3, "S(n)" represents the size S of a patch imaging having a gradation value n, "L" the surface brightness, and "Pre_Lu(n)" an estimated brightness value Pre_Lu of the patch image having the gradation value n. The surface brightness L may be a fixed value that is determined beforehand by the manufacturer or a value that can be changed by the user. Also, the calibration apparatus 800 may determine the surface brightness L in accordance with the environment for installing the display apparatus 300, the purpose of use of the display apparatus 300, and the like. The present embodiment assumes that the surface brightness L is 1.0.

$$S(n)=L/Pre\_Lu \quad \text{(Formula 3)}$$

The patch size determination unit 808 then calculates an size ratio S_ratio from the size S by using the following Formula 4. Subsequently, the patch size determination unit 808 outputs the category information and the size ratio S_ratio of each patch image to the patch display unit 805. Size ratio S_ratio (n) is the size ratio S_ratio of the patch image having the gradation value n, a percentage of the size S(n) of the patch image to the total size S of all the patch images with mutually identical subranges, to each of which the amount of characteristics is determined to belong. Formula 4 can obtain a value that is normalized such that the maximum value of the size ratio S_ratio is 100.

[Expression 1]

$$Sratio(n) = \left( S(n) \div \sum_{n=0}^{255} S(n) \right) \times 100 \quad \text{(Formula 4)}$$

Note that the sizes of the patch images may be determined using a table showing the correlation between the sizes and the estimated brightness values. Alternatively, the sizes of the patch images may be determined using a table showing the correlation between the size ratios and the estimated brightness values.

When the category information and estimated brightness values shown in Table 3 of Embodiment 1 are acquired, the sizes S and size ratios S_ratio shown in Table 4 below are obtained for the brightness category 1, which is a subrange.

TABLE 4

| Patch gradation value | | | Estimated brightness | Surface brightness | Size | Size ratio |
|---|---|---|---|---|---|---|
| R value | G value | B value | value | L | S | S_ratio |
| 0 | 0 | 0 | 0.1 | 1.0 | 10 | 94 |
| 32 | 32 | 32 | 2.1 | | 0.48 | 0.05 |
| 64 | 64 | 64 | 9.6 | | 0.10 | 0.01 |

Figure 8:
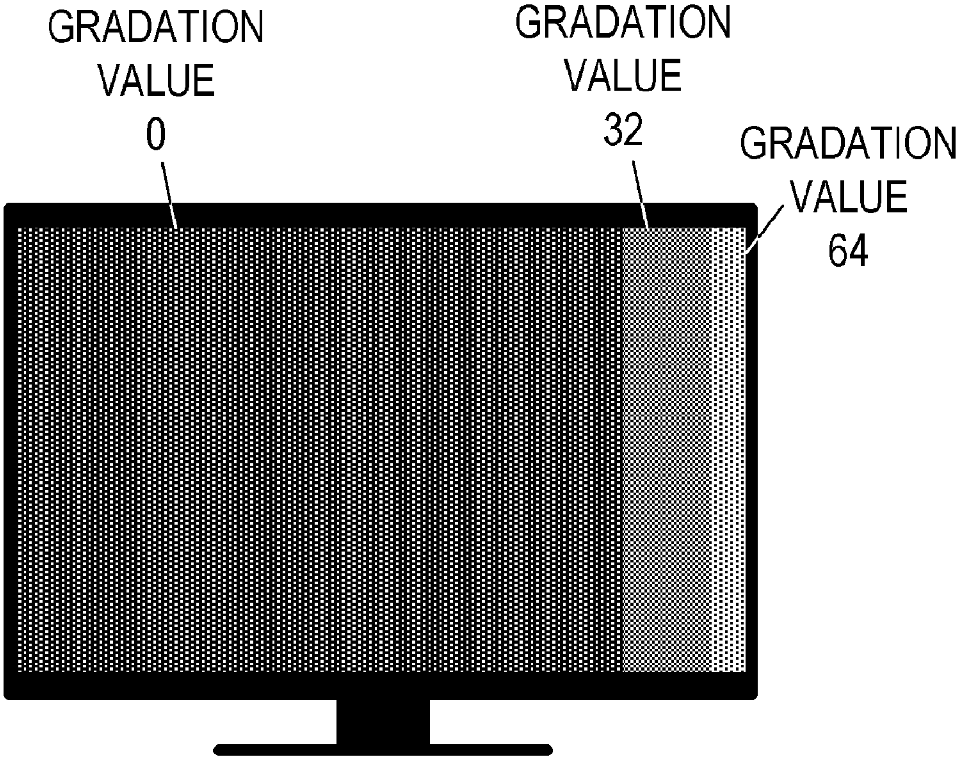
FIG. 8 is a diagram showing an example of a method for displaying patch images according to Embodiment 3.
Figure 9:
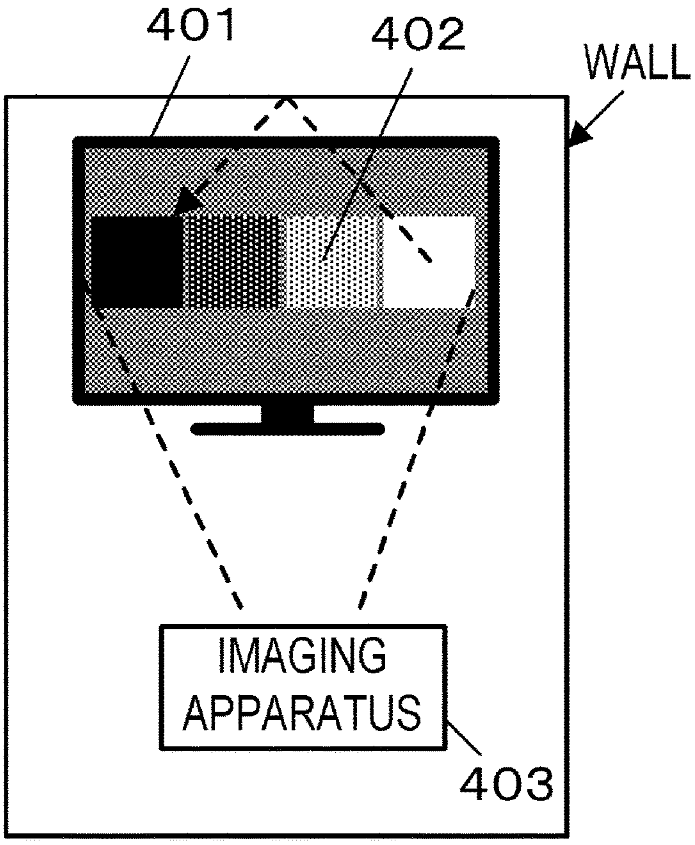
FIG. 9 is a diagram showing problems of the conventional techniques.

The patch display unit 805 displays a plurality of patch images of which the characteristic values are determined to belong to same subrange, simultaneously on the display apparatus 300, in such a manner that the higher the brightness of the patch image is, the smaller the size where the patch image is displayed. Specifically, the plurality of patch images of which the characteristic values are determined to belong to same subrange, are displayed simultaneously on the display apparatus 300, in such a manner that the patch image is displayed at the size determined by the patch size determination unit 808. In the present embodiment, an image arranged a plurality of images (a plurality of images of which the characteristic values are determined to belong to same subrange) at the size ratios S_ratio determined by the patch size determination unit 808 is displayed on the screen. As a result, a plurality of images of which the characteristic values are determined to belong to same subrange, are displayed, in such a manner that the higher the brightness of the patch image is, the smaller the size where the patch image is displayed, as shown in FIG. 8.

The smaller the size of a calibration image is, the lower the impact of this calibration image onto the display brightnesses of the other calibration images. Moreover, the longer the distance from a calibration image, the lower the impact of this calibration image.

According to the present embodiment, a plurality of calibration images of which the characteristic values are determined to belong to same subrange, are displayed in such a manner that the higher the brightness of the calibration image is, the lower the size where the calibration image is displayed. In other words, a calibration image of high brightness that is likely to have an impact on the display brightnesses of the other calibration images is displayed in a smaller size as compared to a calibration image of low brightness.

Such a configuration can lower the impact of a high-brightness calibration image onto the display brightnesses of the other calibration images, resulting in an improvement of the calibration accuracy.

In addition, a position far from the high-brightness calibration image can be set as an acquisition position for acquiring the measurement value of the low-brightness calibration image. Consequently, a measurement with a smaller error can be obtained as the measurement value of the low-brightness calibration image, resulting in a further enhancement of the calibration accuracy.

The effects that can be achieved by Embodiments 1 to 3 are not limited to those described above.

Generally, imaging apparatuses have different optimum exposure times for the brightness of each subject, depending on the various characteristics of the imaging elements installed in the imaging apparatuses, such as the saturation characteristics and noise levels.

According to Embodiments 1 to 3, a plurality of calibration images, of which the characteristic values are determined to belong to the subrange, are displayed simultaneously on the display apparatus for each of the subranges. This can prevent a plurality of calibration images of significantly different display brightnesses from being displayed simultaneously on the display apparatus, and allow a plurality of calibration images of approximately the same display brightness to be displayed simultaneously on the display apparatus. Also, an appropriate exposure time can be selected for each of the subranges, enabling effective use of the dynamic range of the imaging apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-034014, filed on Feb. 25, 2014, which is hereby incorporated by reference herein in its entirety.

What is claimed is:

1. A calibration apparatus for executing calibration of a display apparatus, comprising:

a display control unit configured to control the display apparatus to simultaneously display two or more calibration images of which characteristic values are in one sub-range of a plurality of sub-ranges constituting an available range for the characteristic value;

an acquisition unit configured to acquire a measurement value corresponding to at least a display brightness or a display color of each of the two or more calibration images displayed by the display control unit; and a calibration unit configured to execute calibration of the display apparatus based on the measurement values acquired by the acquisition unit, wherein the acquisition unit acquires the measurement value corresponding to each of the plurality of sub-ranges, and the calibration unit executes calibration of the display apparatus based on the measurement values of the plurality of sub-ranges.

2. The calibration apparatus according to claim 1, wherein the display control unit controls the display apparatus to simultaneously display the two or more calibration images and an image with a predetermined gradation value, the acquisition unit acquires a measurement value of the image with the predetermined gradation value displayed by the display control unit, and in a case where the level of fluctuation of the measurement value of the image with the predetermined gradation value among the plurality of sub-ranges is equal to or greater than a threshold, the display control unit controls the display apparatus to simultaneously display two or more calibration images of which characteristic values are in one narrower sub-range of a plurality of narrower sub-ranges, the narrower sub-range being narrower than the sub-range, the acquisition unit acquires the measurement value corresponding to each of the plurality of narrower sub-ranges, and the calibration unit executes calibration of the display apparatus based on the measurement values of the plurality of narrower sub-ranges.

3. The calibration apparatus according to claim 2, wherein, the display control unit controls the display apparatus to display the image with the predetermined gradation value at the same position among the plurality of sub-ranges.

4. The calibration apparatus according to claim 2, wherein, in a case where the plurality of sub-ranges are used, a plurality of first calibration images are used as a plurality of calibration images, and in a case where the plurality of narrower sub-ranges are used, a plurality of second calibration images larger in number than the plurality of first calibration images are used as the plurality of calibration images.

5. The calibration apparatus according to claim 1, wherein the characteristic value represents at least one of a display brightness, a display color, or a combination of the display brightness and the display color.

6. The calibration apparatus according to claim 1, wherein the display control unit sequentially executes a first process for displaying an image with a first gradation value on the display apparatus and a second process for simultaneously displaying an image with the first gradation value and an image with a second gradation value, the acquisition unit acquires a measurement value of the image with the first gradation value, and in a case where a difference between a measurement value of the image with the first gradation value displayed in the second process and a measurement value of the image with the first gradation value displayed in the first process is equal to or less than a threshold, the display control unit controls the display apparatus to simultaneously display all the calibration images.

7. The calibration apparatus according to claim 1, wherein the display control unit controls the display apparatus to simultaneously display the two or more calibration images in such a manner that the higher the brightness of the calibration image is, the smaller the size where the calibration image is displayed.

8. A calibration method for a display apparatus, comprising:

a display control step of controlling the display apparatus to simultaneously display two or more calibration images of which characteristic values are in one sub-range of a plurality of sub-ranges constituting an available range for the characteristic value;

an acquisition step of acquiring a measurement value corresponding to at least a display brightness or a display color of each of the two or more calibration images displayed in the display control step; and a calibration step of executing calibration of the display apparatus based on the measurement values acquired in the acquisition step, wherein in the acquisition step, the measurement value corresponding to each of the plurality of sub-ranges is acquired, and in the calibration step, calibration of the display apparatus is executed based on the measurement values of the plurality of sub-ranges.

9. The calibration method according to claim 8, wherein in the display control step, the display apparatus is controlled to simultaneously display the two or more calibration images and an image with a predetermined gradation value, in the acquisition step, a measurement value of the image with the predetermined gradation value displayed in the display control step is acquired, and in a case where the level of fluctuation of the measurement value of the image with the predetermined gradation value among the plurality of sub-ranges is equal to or greater than a threshold, in the display control step, the display apparatus is controlled to simultaneously display two or more calibration images of which characteristic values are in one narrower sub-range of a plurality of narrower sub-ranges, the narrower sub-range being narrower than the sub-range, in the acquisition step, the measurement value corresponding to each of the plurality of narrower sub-ranges is acquired, and in the calibration step, calibration of the display apparatus is executed based on the measurement values of the plurality of narrower sub-ranges.

10. The calibration method according to claim 9, wherein, in the display control step, the display apparatus is controlled to display the image with the predetermined gradation value at the same position among the plurality of sub-ranges.

11. The calibration method according to claim 9, wherein, in a case where the plurality of sub-ranges are used, a plurality first calibration images are used as a plurality of calibration images, and in a case where the plurality of narrower sub-ranges are used, a plurality of second calibration images larger in number than the plurality of first calibration images are used as the plurality of calibration images.

12. The calibration method according to claim 8, wherein the characteristic value represents at least one of a display brightness, a display color, or a combination of the display brightness and the display color.

13. The calibration method according to claim 8, wherein in the display control step, a first process for displaying an image with a first gradation value on the display apparatus and a second process for simultaneously displaying an image with the first gradation value and an image with a second gradation value are sequentially executed, in the acquisition step, a measurement value of the image with the first gradation value is acquired, and in a case where a difference between a measurement value of the image with the first gradation value displayed in the second process and a measurement value of the image with the first gradation value displayed in the first process is equal to or less than a threshold, in the display control step, the display apparatus is controlled to simultaneously display all calibration images.

14. The calibration method according to claim 8, wherein in the display control step, the display apparatus is controlled to simultaneously display the two or more calibration images in such a manner that the higher the brightness of the calibration image is, the smaller the size where the calibration image is displayed.

15. A non-transitory computer readable medium that stores a program, wherein the program causes a computer to execute a calibration method for a display apparatus, the calibration method comprises:

a display control step of control the display apparatus to simultaneously display two or more calibration images of which characteristic values are in one sub-range of a plurality of sub-ranges constituting an available range for the characteristic value;

an acquisition step of acquiring a measurement value corresponding to at least a display brightness or a display color of each of the two or more calibration images displayed in the display control step; and a calibration step of executing calibration of the display apparatus based on the measurement values acquired in the acquisition step, wherein in the acquisition step, the measurement value corresponding to each of the plurality of sub-ranges is acquired, and in the calibration step, calibration of the display apparatus is executed based on the measurement values of the plurality of sub-ranges.

16. A calibration apparatus for executing calibration of a display apparatus, comprising:

a control unit configured to control the display apparatus to simultaneously display two or more calibration images;

an acquisition unit configured to acquire a measurement value corresponding to at least a display brightness or a display color of each of the two or more calibration images; and a calibration unit configured to execute calibration of the display apparatus based on the measurement values acquired by the acquisition unit, wherein the control unit controls the display apparatus to simultaneously display the two or more calibration images in such a manner that the higher the brightness of the calibration image is, the smaller the size where the calibration image is displayed.

17. A calibration method for a display apparatus, comprising:

a control step of controlling the display apparatus to simultaneously display two or more calibration images;

an acquisition step of acquiring a measurement value corresponding to at least a display brightness or a display color of each of the two or more calibration images; and a calibration step of executing calibration of the display apparatus based on the measurement values acquired in the acquisition step, wherein in the control step, the display apparatus is controlled to simultaneously display the two or more calibration images in such a manner that the higher the brightness of the calibration image is, the smaller the size where the calibration image is displayed.

* * * * *